United States Patent
Li

(10) Patent No.: US 11,520,383 B1
(45) Date of Patent: Dec. 6, 2022

(54) TOUCHPAD DEVICE

(71) Applicant: Chicony Electronics Co., Ltd., New Taipei (TW)

(72) Inventor: Po-Hsin Li, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/408,984

(22) Filed: Aug. 23, 2021

(30) Foreign Application Priority Data

May 12, 2021 (TW) .................................. 110117178

(51) Int. Cl.
*G06F 1/16* (2006.01)
*G06F 3/041* (2006.01)

(52) U.S. Cl.
CPC .......... *G06F 1/169* (2013.01); *G06F 3/04164* (2019.05)

(58) Field of Classification Search
CPC ... G06F 1/169; G06F 3/04164; G06F 3/03547
See application file for complete search history.

(56) References Cited

U.S. PATENT DOCUMENTS

2021/0263556 A1\* 8/2021 Degner .................. G06F 1/169
2022/0066580 A1\* 3/2022 Lin ..................... G06F 3/03547

\* cited by examiner

*Primary Examiner* — Afroza Chowdhury
(74) *Attorney, Agent, or Firm* — Muncy, Geissler, Olds & Lowe, P.C.

(57) ABSTRACT

A touchpad device includes a substrate, a circuit board, a connection plate, a resilient member, a triggering member, a first balance bar, a second balance bar, a first swing plate, and a second swing plate. The circuit board is disposed above the substrate and includes a trigger switch. The connection plate has a hollow hole corresponding to the trigger switch. The resilient member is disposed between the substrate and the circuit board. The triggering member corresponds to the hollow hole. The first balance bar is disposed between a first side of the connection plate and the substrate, and the second balance bar is disposed between a second side of the connection plate and the substrate. The swing plates are disposed between the substrate and the circuit board and are pressable to move with respect to the substrate, thereby driving the triggering member to move toward the trigger switch.

16 Claims, 7 Drawing Sheets

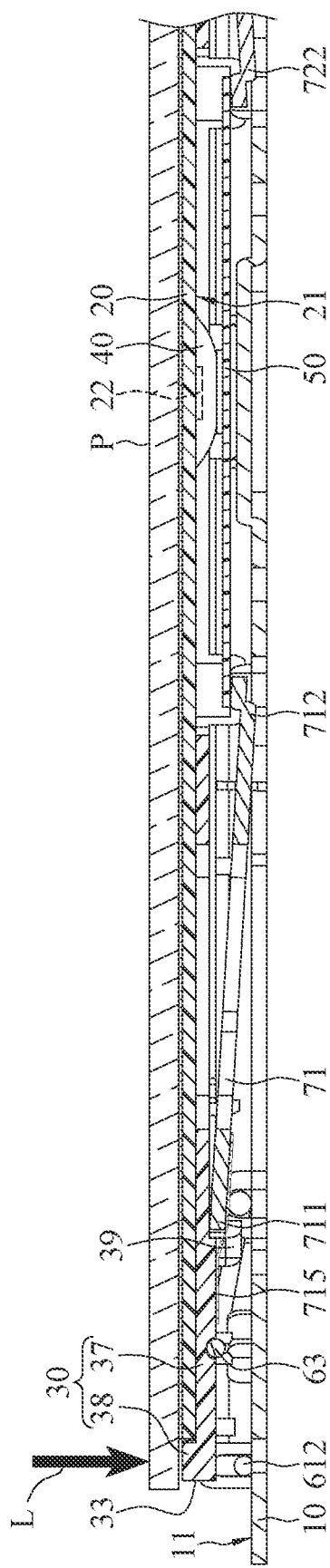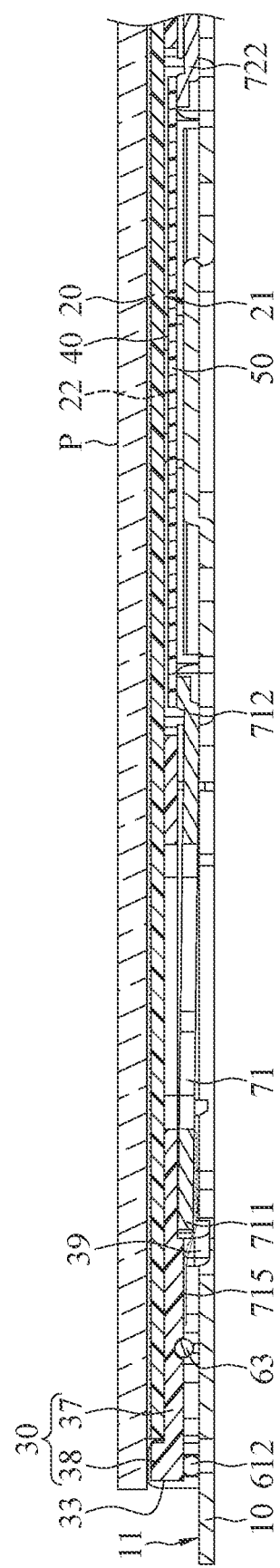

TOUCHPAD DEVICE

CROSS-REFERENCE TO RELATED APPLICATION

This non-provisional application claims priority under 35 U.S.C. § 119(a) to Patent Application No. 110117178 filed in Taiwan, R.O.C. on May 12, 2021. the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touchpad and a substrate. The touchpad has a pivot side, and the touchpad is pivotally fixed on the substrate through the pivot side. When a portion of the touchpad away from the pivot side is pressed, the touchpad swings downwardly with respect to the substrate by taking the pivot side as the swing axis so as to generate corresponding signal(s).

However, when the user operates the touchpad, he or she would not always accurately press the portion of the touchpad away from the pivot side. Hence, when the user presses the pivot side of the touchpad or presses a region or a corner adjacent to the pivot side, the pressing force of the user cannot allow the touchpad to be moved downwardly smoothly, thus failing to generate corresponding signal(s), and thereby causing inconvenience in operation, influence in operation feelings, and other issues.

In view of this, in one embodiment, a touchpad device is provided. The touchpad device comprises a substrate, a circuit board, a connection plate, a resilient member, a triggering member, a first balance bar, a second balance bar, a first swing plate, and a second swing plate. The substrate comprises a top surface. The circuit board is disposed above the top surface of the substrate. The circuit board comprises a bottom surface facing the top surface, and the bottom surface comprises a trigger switch. The connection plate is fixed on the bottom surface of the circuit board. The connection plate comprises a first side, a second side, a third side, and a fourth side connected to each other. The first side and the second side are opposite sides. The third side and the fourth side are opposite sides. The connection plate has a hollow hole corresponding to the trigger switch. The resilient member is disposed between the substrate and the circuit board. The triggering member is disposed between the substrate and the circuit board and corresponds to the hollow hole. The first balance bar is disposed between the first side and the substrate, and the second balance bar is disposed between the second side and the substrate. The first swing plate and the second swing plate are disposed between the substrate and the circuit board. The first swing plate is connected between the third side and the triggering member, and the second swing plate is connected between the fourth side and the triggering member. The first swing plate and the second swing plate are pressable to move with respect to the substrate, so that the first swing plate and the second swing plate drive the triggering member to move upwardly and move toward the trigger switch.

Based on the above, in the touchpad device according to one or some embodiments of the instant disclosure, the first balance bar and the second balance bar are respectively connected to the first side and the second side of the connection plate. Moreover, the first swing plate and the second swing plate are pressable to move with respect to the substrate, so that the first swing plate and the second swing plate drive the triggering member to move upwardly and move toward the trigger switch. Therefore, when any portion of the touchpad device (e.g., any corner or any edge of the touchpad device) is pressed, the pressing force would always allow the circuit board and the triggering member to come close to, to abut against, and to press each other, thereby generating pressing feelings of the touchpad device for the user, thus greatly reducing the idle stroke of the touchpad as well as improving the operation feelings for the user.

BRIEF DESCRIPTION OF THE DRAWINGS

The disclosure will become more fully understood from the detailed description given herein below for illustration only, and thus not limitative of the disclosure, wherein:

FIG. 5 illustrates a cross-sectional view along line 5-5 shown in FIG. 4;

FIG. 6 illustrates a schematic view showing that the touchpad device in FIG. 5 is being pressed;

DETAILED DESCRIPTION

Figure 1:
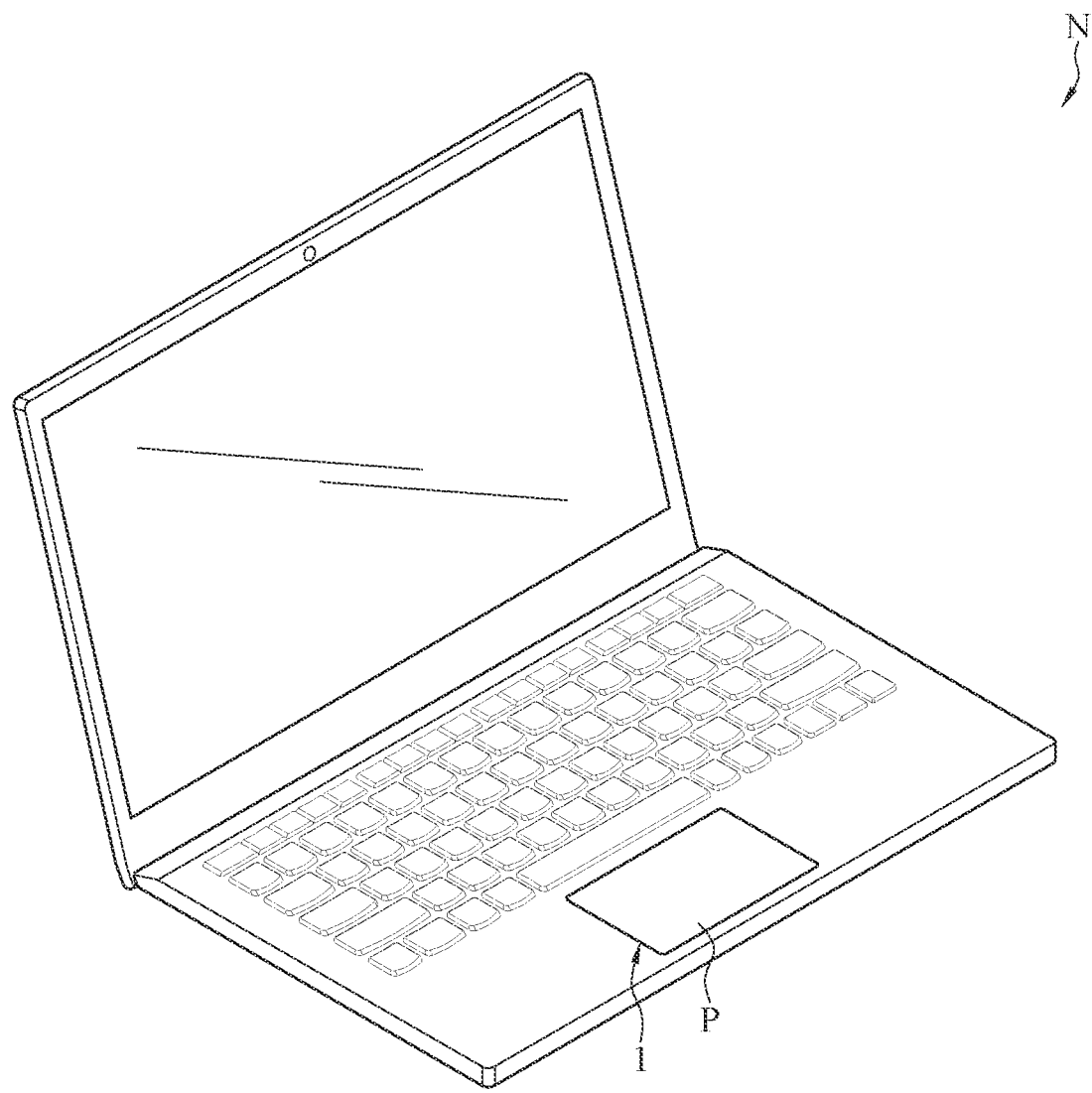
FIG. 1 illustrates a schematic application view of a touchpad device according to an exemplary embodiment of the instant disclosure.

It should be noted that, in the descriptions for the embodiments, the ordinal numbers, e.g., "first", "second", "third", "fourth", etc., are used to describe different elements, and these elements are not limited due to the use of these ordinal numbers. Moreover, for sake of convenience and clarity, the thicknesses or the dimensions of the elements in the drawings are presented exaggeratedly, omittedly, or generally, and the person having ordinary skills in the art still can realize and read. The sizes shown in all the drawings in reference with the specification, are not intended to limit the present disclosure, but merely facilitate the understanding and reading for those skilled in the art. Modifications and variations in different scale or sizes can be made without departing from the spirit of the present disclosure. In all the drawings, the same reference numbers are used to indicate the same or similar elements.

Figure 2:
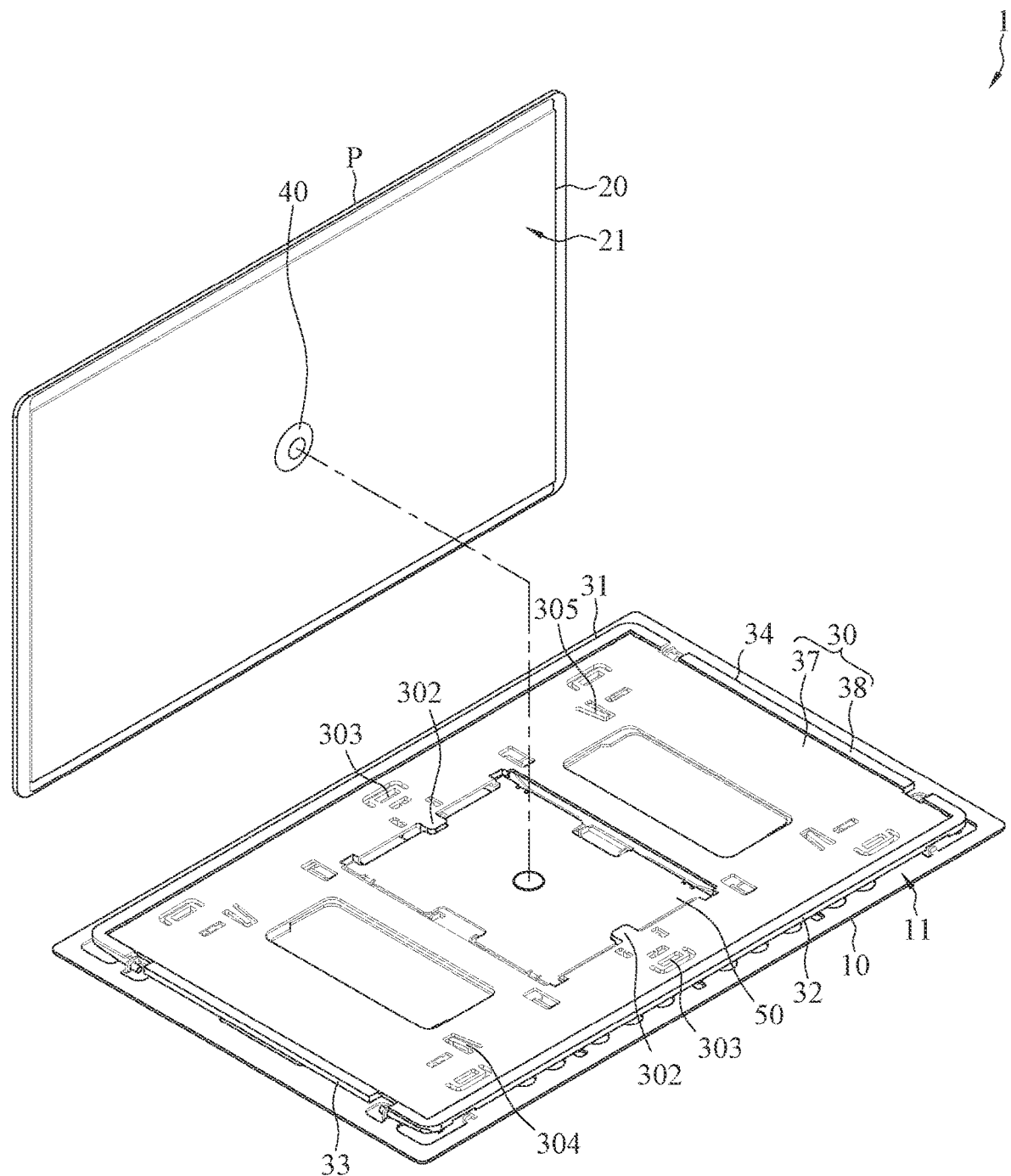
FIG. 2 illustrates an exploded view of the touchpad device of the exemplary embodiment.
Figure 3:
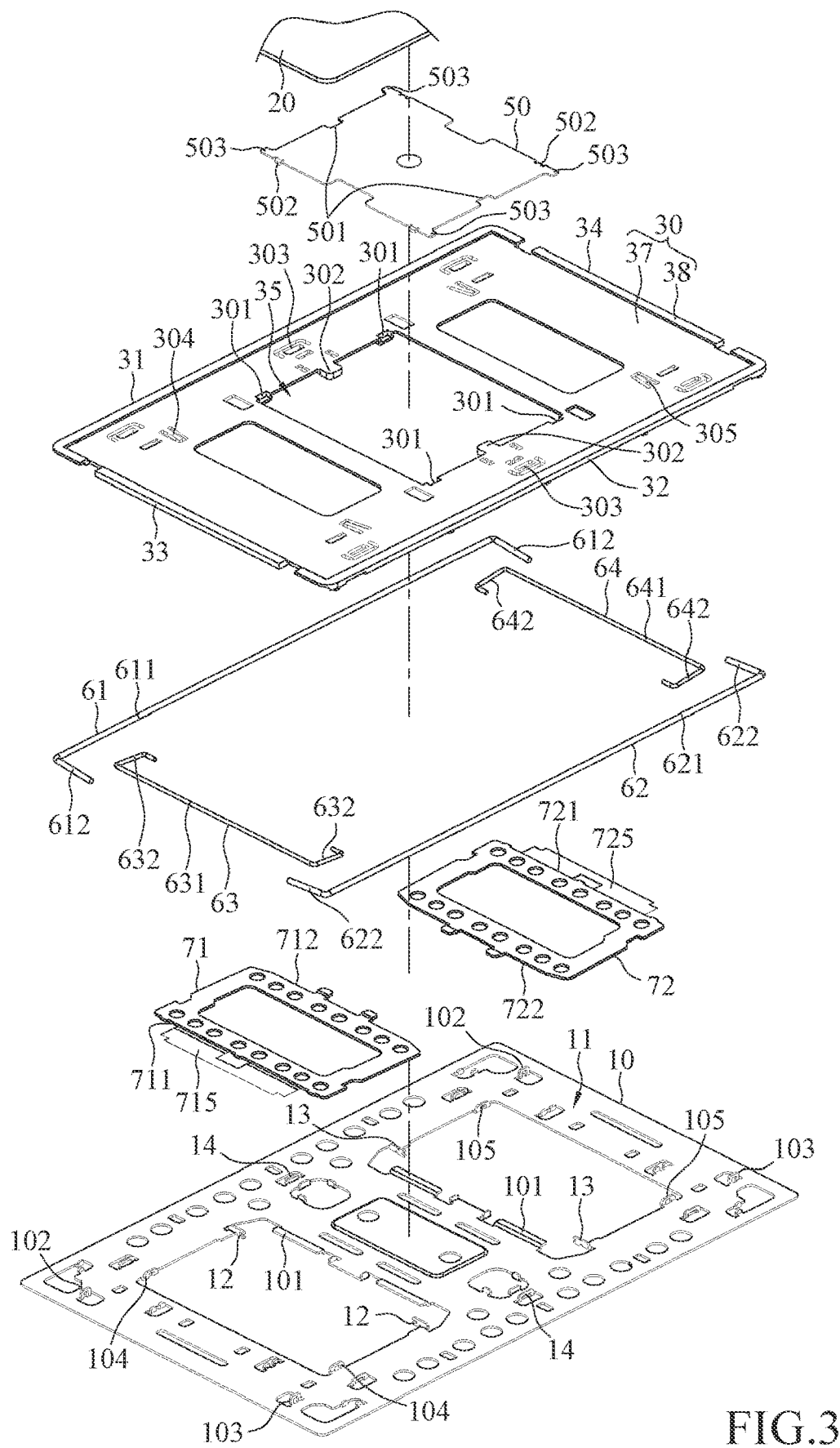
FIG. 3 illustrates another exploded view of the touchpad device of the exemplary embodiment.
Figure 4:
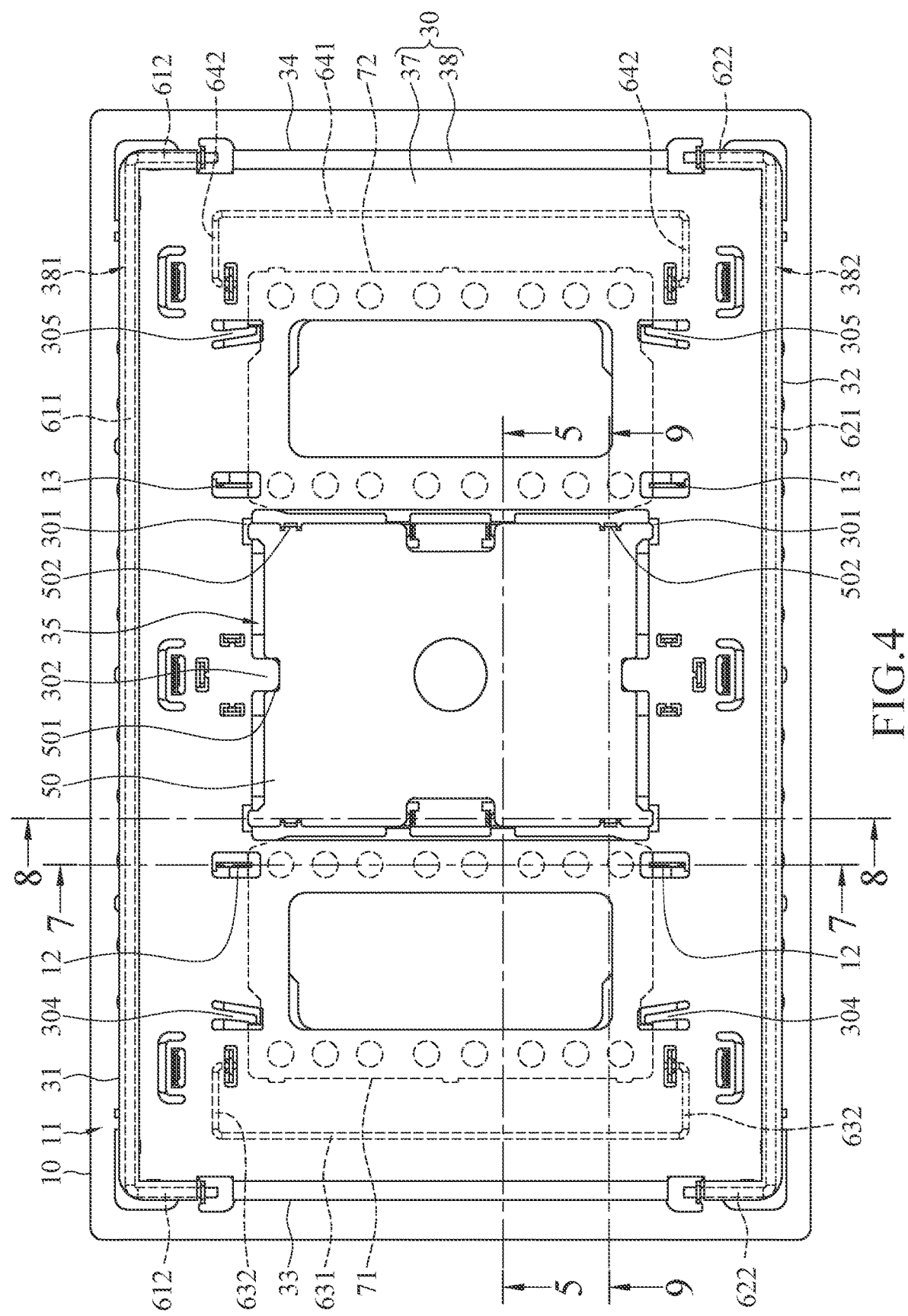
FIG. 4 illustrates a top view of the touchpad device of the exemplary embodiment.

FIG. 1 illustrates a schematic application view of a touchpad device according to an exemplary embodiment of the instant disclosure. FIG. 2 illustrates an exploded view of the touchpad device of the exemplary embodiment. FIG. 3 illustrates another exploded view of the touchpad device of the exemplary embodiment. FIG. 4 illustrates a top view of the touchpad device of the exemplary embodiment. FIG. 5 illustrates a cross-sectional view along line 5-5 shown in FIG. 4. As shown in FIGS. 1 and 2, the touchpad device 1 may be applied in a computer product, and the user can operate the touchpad device 1 by sliding or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but embodiments are not limited thereto. In some embodiments, the touchpad device 1 may be applied in other portable computers (e.g., tablet computers). Alternatively, the touchpad device 1 may be an individual device and may be capable of externally connected to a portable computer, but embodiments are not limited thereto.

As shown in FIGS. 2 to 5, in this embodiment, the touchpad device 1 comprises a substrate 10, a circuit board 20, a connection plate 30, a resilient member 40, a triggering member 50, a first balance bar 61, a second balance bar 62, a first swing plate 71, and a second swing plate 72. The substrate 10 may be a rigid plate made of metal (e.g., iron, aluminum, alloy, etc.), or plastic material. In this embodiment, the substrate 10 has a top surface 11. The circuit board 20, the connection plate 30, the resilient member 40, the triggering member 50, the first balance bar 61, the second balance bar 62, the first swing plate 71. and the second swing plate 72 are all disposed above the top surface 11.

As shown in FIGS. 2 to 5, the circuit board 20 has a bottom surface 21, and the bottom surface 21 faces the top surface 11 of the substrate 10. In this embodiment, a trigger switch 22 is provided at a middle portion of the bottom surface 21 of the circuit board 20. For example, the trigger switch 22 may be a button switch or a microswitch. but embodiments are not limited thereto. In some embodiments, the circuit board 20 may be a printed circuit board (PCB), a flexible printed circuit board (FPCB), or a Rigid-Flex PCB.

As shown in FIGS. 2 to 5, the connection plate 30 is fixed on the bottom surface 21 of the circuit board 20. The connection plate 30 may be a rigid plate made of metal or plastic, and the connection plate 30 is fixed on the bottom surface 21 of the circuit board 20 through. for example, adhering, riveting, locking, or welding. The outer periphery of the connection plate 30 comprises a first side 31, a second side 32, a third side 33, and a fourth side 34 connected to each other. The first side 31 and the second side 32 are opposite sides, and the third side 33 and the fourth side 34 are opposite sides. The length of the first side 31 is greater than or equal to the length of the third side 33 and the length of the fourth side 34, and the length of the second side 32 is greater than or equal to the length of the third side 33 and the length of the fourth side 34, but embodiments are not limited thereto. Moreover, the connection plate 30 further has a hollow hole 35, and the hollow hole 35 is defined through two opposite surfaces of the connection plate 30 and corresponds to the trigger switch 22.

As shown in FIGS. 2 to 5, the resilient member 40 is disposed between the substrate 10 and the circuit board 20. In this embodiment, the resilient member 40 is fixed (e.g., by adhering, riveting, locking, or welding) on the top surface 11 of the substrate 10 or on the bottom surface 21 of the circuit board 20, and the resilient member 40 corresponds to the trigger switch 22. The resilient member 40 makes the circuit board 20 be kept at a height position so as to keep spaced apart from the substrate 10. In some embodiments, the resilient member 40 may be a block (as shown in FIG. 2, may be a plastic block or a metal block) or a magnetic member. Alternatively, in some embodiments. the resilient member 40 may be a rubber dome, a metal dome, a spring, an elastic piece, or other elastic members, such that the resilient member 40 can store the elastic force upon being pressed.

Further, as shown in FIGS. 2 to 5, a touchpad P is disposed and stacked above the circuit board 20, and the circuit board 20 is nearer to the substrate 10 as compared with the touchpad P (namely, the distance between the circuit board 20 and the substrate 10 is less than the distance between the touchpad P and the substrate 10). The touchpad P may be a plate made of glass or polyester resin (mylar), and is provided for being touched or pressed by the user. The circuit board 20 may perform functions such as scrolling, zooming in, zooming out, opening window, or the like in response to the movement or the gesture of the user's finger(s) on the touchpad P. Alternatively, in some embodiments, the circuit board 20 may perform functions such as selecting. displaying menu, or the like in response to the click or double click of the user's finger(s) on the touchpad P. For example, when the touchpad P is pressed so as to be moved downwardly with respect to the substrate 10, the resilient member 40 and the trigger switch 22 are pressed against each other, so that the trigger switch 22 is triggered to generate signal(s). Moreover, when the touchpad P is released, if the resilient member 40 is an elastic member, the touchpad P is moved resiliently to the height position with the elastic force stored in the resilient member 40; if the trigger switch 22 is a button switch, the touchpad P is pushed by the elastic force stored in the trigger switch 22 and is moved resiliently to the height position.

As shown in FIG. 5, in this embodiment, the resilient member 40 is a metal dome and is elastic. and the trigger switch 22 is a trigger spot disposed on the bottom surface 21 of the circuit board 20. When the touchpad P is pressed and moved downwardly with respect to the substrate 10, the touchpad P presses and compresses the resilient member 40 to push and trigger the trigger switch 22 and to store the elastic force. When the touchpad P is released, the touchpad is moved resiliently to the height position with the elastic force stored in the resilient member 40 (the metal dome), but embodiments are not limited thereto. In some embodiments, the resilient member 40 and the trigger switch 22 may have different collaborations. For example, in one embodiment, the trigger switch 22 is a button switch or a microswitch so as to be elastic, and the resilient member 40 is an inelastic block, or the resilient member 40 may be a rubber dome, a spring, or an elastic piece that are elastic.

In some embodiments, the touchpad P and the circuit board 20 may be integrated as one plate. For instance, neighboring surfaces of the touchpad P and the circuit board 20 may be combined with each other by glues, chemical adhesives (e.g., light curable adhesives), physical adhesives (e.g., thermosetting adhesives or thermoplastic adhesives), or the like, such that the touchpad P and the circuit board 20 are integrated as one plate.

As shown in FIGS. 2 to 5, the triggering member 50 is disposed between the substrate 10 and the circuit board 20 and corresponds to the hollow hole 35. In this embodiment, the triggering member 50 is a plate and in the hollow hole 35 to correspond to the hollow hole 35, but embodiments are not limited thereto. In some embodiments, the triggering member 50 may be above or below the hollow hole 35, and the triggering member 50 is a rigid plate made of metal or plastic. Furthermore, the resilient member 40 may be disposed between the triggering member 50 and the circuit board 20.

As shown in FIGS. 3 and 4, the first balance bar 61 comprises a first rotation shaft 611 and two first side bars 612 respectively connected to two ends of the first rotation shaft 611. In this embodiment, the two first side bars 612 are substantially perpendicular to the first rotation shaft 611. The first rotation shaft 611 is arranged along the first side 31 of the connection plate 30 and is rotatable with respect to the connection plate 30. In this embodiment, the connection plate 30 comprises a first long groove 381 disposed on the first side 31, and the first rotation shaft 611 of the first balance bar 61 is pivotally connected in the first long groove 381. Each of the first side bars 612 of the first balance bar 61 is movably connected to the substrate 10. In this embodiment, two first assembling members 102 protrude from the substrate 10 and are spaced apart from each other, and the two first assembling members 102 are provided for being assembled with the two first side bars 612. Each of the first assembling members 102 is a hook holder integrally extending upward from the substrate 10 (in this embodiment, the hook holder is a U-shaped hook holder, but embodiments are not limited thereto, the hook holder may be an L-shaped hook holder, a T-shaped hook holder, or hook holders with other shaped). End portions of the two first side bars 612 are respectively inserted into the two first assembling members 102. Accordingly, when the touchpad P is pressed to move toward the substrate 10, the first rotation shaft 611 is rotatable with respect to the connection plate 30, and the end portion of each of the first side bars 612 is slidable with respect to the corresponding first assembling member 102, so that each of the first side bars 612 is swingable with respect to the substrate 10.

As shown in FIGS. 3 and 4, the second balance bar 62 comprises a second rotation shaft 621 and two second side bars 622 respectively connected to two ends of the second rotation shaft 621. In this embodiment, the two second side bars 622 are substantially perpendicular to the second rotation shaft 621. The second rotation shaft 621 is arranged along the second side 32 of the connection plate 30 and is rotatable with respect to the connection plate 30. In this embodiment, the connection plate 30 comprises a second long groove 382 disposed on the second side 32, and the second rotation shaft 621 of the second balance bar 62 is pivotally connected in the second long groove 382. Each of the second side bars 622 of the second balance bar 62 is movably connected to the substrate 10. In this embodiment, two second assembling members 103 protrude from the substrate 10 and are spaced apart from each other, and the two second assembling members 103 are provided for being assembled with the two second side bars 622. Each of the second assembling members 103 is a hook holder integrally extending upward from the substrate 10 (in this embodiment, the hook holder is a U-shaped hook holder, but embodiments are not limited thereto; the hook holder may be an L-shaped hook holder, a T-shaped hook holder, or hook holders with other shaped). End portions of the two second side bars 622 are respectively inserted into the two second assembling members 103. Accordingly, when the touchpad P is pressed to move toward the substrate 10, the second rotation shaft 621 is rotatable with respect to the connection plate 30, and the end portion of each of the second side bars 622 is slidable with respect to the corresponding second assembling member 103, so that each of the second side bars 622 is swingable with respect to the substrate 10.

As shown in FIGS. 2 to 5, the first swing plate 71 and the second swing plate 72 are disposed between the substrate 10 and the circuit board 20. The first swing plate 71 is connected between the third side 33 and the triggering member 50, and the second swing plate 72 is connected between the fourth side 34 and the triggering member 50. Moreover, when the first swing plate 71 and the second swing plate 72 are pressed, the first swing plate 71 and the second swing plate 72 are swingable with respect to the substrate 10, and the first swing plate 71 and the second swing plate 72 drive the triggering member 50 to move upwardly and move toward the circuit board 20 to press the trigger switch 22.

As shown in FIGS. 2 to 5, the first swing plate 71 comprises a first outer side 711 and a first inner side 712. The first outer side 711 is nearer to the third side 33 of the connection plate 30, as compared with the first inner side 712. In other words, in this embodiment, the distance between the first outer side 711 and the third side 33 of the connection plate 30 is less than the distance between the first inner side 712 and third side 33 of the connection plate 30. The first swing plate 71 abuts against the bottom portion of the triggering member 50 with the first inner side 712. A first flexible sheet 715 is connected between the first outer side 711 of the first swing plate 71 and the connection plate 30. Therefore, when the first swing plate 71 swings, the first swing plate 71 abuts against the triggering member 50 to move upwardly through the first inner side 712. The second swing plate 72 comprises a second outer side 721 and a second inner side 722. The second outer side 721 is nearer to the fourth side 34 of the connection plate 30, as compared with the second inner side 722. In other words, in this embodiment, the distance between the second outer side 721 and the fourth side 34 of the connection plate 30 is less than the distance between the second inner side 722 and fourth side 34 of the connection plate 30. The second swing plate 72 abuts against the bottom portion of the triggering member 50 with the second inner side 722. A second flexible sheet 725 is further connected between the second outer side 721 of the second swing plate 72 and the connection plate 30. Therefore, when the second swing plate 72 swings, the second swing plate 72 abuts against the triggering member 50 to move upwardly with the second inner side 722. In some embodiments, the first swing plate 71, the first flexible sheet 715, the second swing plate 72, and the second flexible sheet 725 may be rectangular-shaped, triangular-shaped, trapezoidal-shaped, polygonal-shaped, H-shaped, U-shaped, or irregular-shaped.

Furthermore, the first flexible sheet 715 and the second flexible sheet 725 may be elastic sheets having flexibility and made of plastic or metal, while the first swing plate 71 and the second swing plate 72 may be rigid plates made of plastic or metal, but embodiments are not limited thereto. Moreover, the rigidities of the first swing plate 71 and the second swing plate 72 may be greater than the rigidities of the first flexible sheet 715 and the second flexible sheet 725. For example, the thickness of the first swing plate 71 (or the second swing plate 72) may be greater than the thickness of the first flexible sheet 715 (or the second flexible sheet 725). Accordingly, the first outer side 711 of the first swing plate 71 is swingable with respect to the connection plate 30 through the flexibility of the first flexible sheet 715, and the second outer side 721 of the second swing plate 72 is swingable with respect to the connection plate 30 through the flexibility of the second flexible sheet 725.

In some embodiments, in the case that the first flexible sheet 715 and the second flexible sheet 725 are made of plastic, the first flexible sheet 715 and the second flexible sheet 725 may be fixed with other components by adhering; in the case that the first flexible sheet 715 and the second flexible sheet 725 are made of metal, the first flexible sheet 715 and the second flexible sheet 725 may be fixed with other components by adhering, welding, riveting, or the like, but embodiments are not limited thereto.

Accordingly, as shown in FIGS. 2 to 5, according to one or some embodiments of the instant disclosure, the first rotation shaft 611 of the first balance bar 61 is arranged along the first side 31 of the connection plate 30 and the second rotation shaft 621 of the second balance bar 62 is arranged along the second side 32 of the connection plate 30. Therefore, the rigidities of the corners and the periphery of the touchpad device 1 can be increased. Hence, when any corner or any edge of the touchpad P is pressed, the pressing force can be transmitted to other components through the first balance bar 61 and the second balance bar 62, thereby greatly reducing the idle stroke of the touchpad P upon the touchpad P is pressed and preventing the deflection and bending of the touchpad P during the operation.

Furthermore, as shown in FIGS. 3 and 4, in this embodiment, the connection plate 30 comprises a main plate 37 and a surrounding frame 38 connected around the main plate 37. The main plate 37 leans against the bottom surface 21 of the circuit board 20, the thickness of the surrounding frame 38 is greater than the thickness of the main plate 37, and the surrounding frame 38 leans against the periphery of the circuit board 20, so that the circuit board 20 is received in the connection plate 30, thus reducing the overall thickness of the touchpad device 1. Moreover, the first long groove 381 and the second long groove 382 are at the bottom portion of the surrounding frame 38 which has a greater thickness, so that the first long groove 381 and the second long groove 382 are respectively pivotally connected to the first rotation shaft 611 of the first balance bar 61 and the second rotation shaft 621 of the second balance bar 62. Therefore, the first balance bar 61 and the second balance bar 62 can be configured with greater diameters, thus improving the overall structural strength of the device and thereby further facilitating the force transmission of the touchpad P upon the corner or the edge of the touchpad P is pressed.

Furthermore, as shown in FIGS. 3 and 4, in this embodiment, the two ends of the first rotation shaft 611 of the first balance bar 61 respectively extend toward the third side 33 and the fourth side 34 of the connection plate 30, so that the two first side bars 612 of the first balance bar 61 can be respectively arranged much closer to the third side 33 and the fourth side 34 of the connection plate 30. Likewise, the two ends of the second rotation shaft 621 of the second balance bar 62 respectively extend toward the third side 33 and the fourth side 34, so that the two second side bars 622 of the second balance bar 62 can be respectively arranged much closer to the third side 33 and the fourth side 34. Therefore, the rigidities of the corners and the periphery of the touchpad device 1 can be increased. Hence, when any corner or any edge of the touchpad P is pressed, the transmission of the pressing force on the touchpad P can be enhanced thereby improving the linking between the components.

Moreover, according to one or some embodiments of the instant disclosure, the first swing plate 71 is connected between the third side 33 of the connection plate 30 and the triggering member 50 and the second swing plate 72 is connected between the fourth side 34 of the connection plate 30 and the triggering member 50. Furthermore, when the first swing plate 71 and the second swing plate 72 are pressed, the first swing plate 71 and the second swing plate 72 drive the triggering member 50 to move upwardly and move toward the trigger switch 22. Therefore, the linking between components of the device can be improved upon the corner or the edge of the touchpad P is pressed. Furthermore, the trigger switch 22 of the circuit board 20 can be triggered more quickly, thus shortening the pressing stroke of the touchpad P. Detailed descriptions are provided as below.

Please refer to FIGS. 3, 5, and 6. FIG. 6 illustrates a schematic view showing that the touchpad device in FIG. 5 is being pressed. In this embodiment, when a corner portion, an edge portion, or a region of the touchpad P adjacent to the third side 33 is pressed (as indicated by the arrow L shown in FIG. 5, in this embodiment, the region of the touchpad P adjacent to the third side 33 is pressed), through the first balance bar 61 and the second balance bar 62, the pressing force can be transmitted to a direction toward the fourth side 34 to link to other components. Moreover, through the first flexible sheet 715, the pressing force drives the first swing plate 71 to swing with respect to the substrate 10. Therefore, the first inner side 712 of the first swing plate 71 is moved toward the circuit board 20 and move upwardly, so that the first swing plate 71 drives the triggering member 50 to move toward the trigger switch 22 and move upwardly. Hence, the triggering member 50 presses and compresses the resilient member 40 to trigger the trigger switch 22 of the circuit board 20 more quickly, thereby greatly shortening the pressing stroke of the touchpad P. Similarly, when a corner portion, an edge portion, or a region of the touchpad P adjacent to the fourth side 34 is pressed, through the second flexible sheet 725, the pressing force drives the second swing plate 72 to swing with respect to the substrate 10. Therefore, the second inner side 722 of the second swing plate 72 is moved toward the circuit board 20 and move upwardly, so that the second swing plate 72 drives the triggering member 50 to move toward the trigger switch 22 and move upwardly. Hence, the triggering member 50 presses and compresses the resilient member 40 to trigger the trigger switch 22 of the circuit board 20 quicklier, thereby greatly shortening the pressing stroke of the touchpad P. Furthermore, when the touchpad P is released, the resilient member 40 pushes the triggering member 50 to move downwardly with the elastic force stored in the resilient member 40, so that the touchpad P is moved resiliently to the unpressed position (i.e. the aforementioned height position).

As illustrated above, when any edge or corner of the touchpad P is pressed, the touchpad P can be moved upwardly and downwardly more stably through the linkage of the first swing plate 71, the second swing plate 72, the first balance bar 61, and the second balance bar 62, thereby greatly reducing the idle stroke of the touchpad P upon the touchpad P is pressed, preventing the deflection and bending of the touchpad P during the operation, improving the linking of the components of the device upon the corner or the edge of the touchpad P is pressed, and accelerating the triggering of the trigger switch 22 of the circuit board 20 thus shortening the pressing stroke of the touchpad P.

Figure 7:
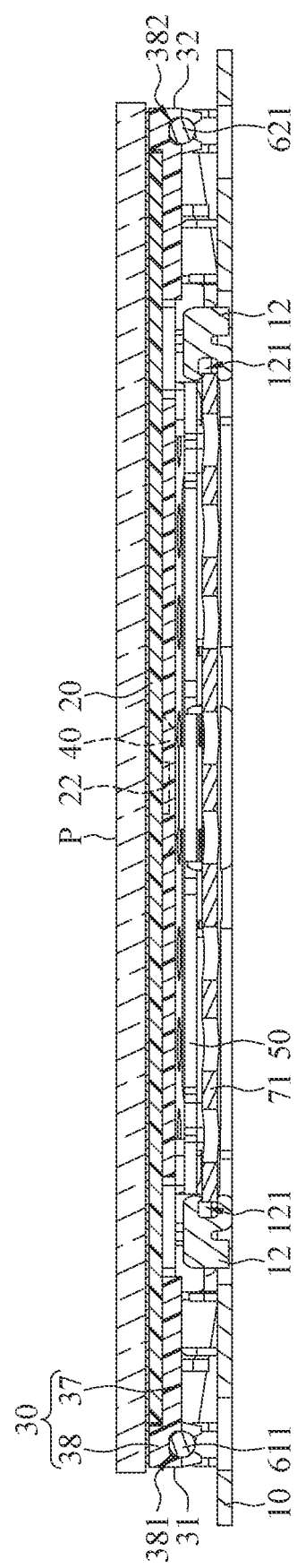
FIG. 7 illustrates a cross-sectional view along line 7-7 shown in FIG. 4.

FIG. 7 illustrates a cross-sectional view along line 7-7 shown in FIG. 4. As shown in FIGS. 3, 4, and 7, in this embodiment, the substrate 10 further comprises at least one supporting member 12. In this embodiment, the substrate 10 comprises two supporting members 12, but embodiments are not limited thereto. Each of the supporting members 12 abuts against the bottom portion of the first swing plate 71 and is between the first outer side 711 and the first inner side 712. The supporting member 12 may be a plate, a block, or a rib, so that the first swing plate 71 can swing by taking the supporting member 12 as the fulcrum upon the first swing plate 71 is pressed. Moreover, in this embodiment, each of the supporting members 12 is a C-shaped supporting member and has a lateral guide slot 121, and two opposite sides of the first swing plate 71 are respectively received in the two lateral guide slots 121 of the two supporting members 12. Therefore, during the swinging process of the first swing plate 71, the first swing plate 71 can be limited by the supporting member(s) 12 to prevent the deflection and the wobbling of the first swing plate 71. Furthermore, as shown in FIG. 3, the substrate 10 may also comprise at least one supporting member 13. In this embodiment, the substrate 10 comprises two supporting members 13, but embodiments are not limited thereto. Each of the supporting members 13 abuts against the bottom portion of the second swing plate 72. so that the second swing plate 72 can swing by taking the supporting member 13 as the fulcrum upon the second swing plate 72 is pressed. The supporting member 13 and the supporting member 12 may have identical structure or similar structures, and repeated descriptions are thus omitted herein.

Figure 8:
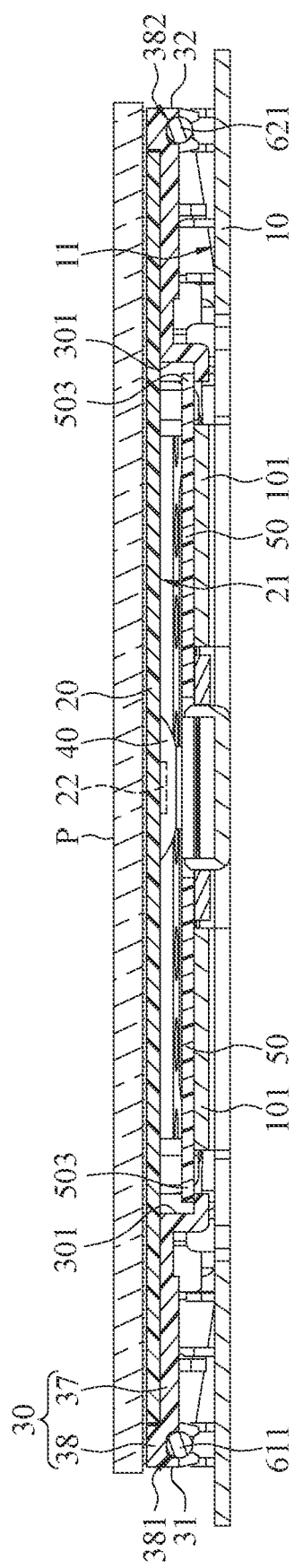
FIG. 8 illustrates a cross-sectional view along line 8-8 shown in FIG. 4.

FIG. 8 illustrates a cross-sectional view along line 8-8 shown in FIG. 4. As shown in FIGS. 3, 4, and 8, in this embodiment, the triggering member 50 is in the hollow hole 35, and the connection plate 30 has at least one leaning portion 301. Here, the connection plate 30 has several leaning portions 301 respectively adjacent to four corners of the hollow hole 35, and the leaning portions 301 are notches at the edge of the hollow hole 35. The triggering member 50 has several leaning members 503, and the number and positions of the leaning members 503 correspond to the number and positions of the leaning portions 301. Each of the leaning members 503 is a plate extending from the periphery of the triggering member 50, and the leaning members 503 of the triggering member 50 are respectively leaned against the leaning portions 301 of the connection plate 30, so that the triggering member 50 is supported and the horizontal movement of the triggering member 50 is limited, thus preventing deflection or dropping of the trigging member 50 during operation. Moreover, during the upward movement of the triggering member 50, once one side of the triggering member 50 tilts, the leaning member 503 at the opposite side of the triggering member 50 interferes and abuts against the corresponding leaning portion 301, thereby further accelerating the triggering member 50 to push and compress the resilient member 40 to trigger the trigger switch 22.

However, it is understood that the foregoing embodiments are illustrative purposes. In some embodiments, each of the leaning portions 301 of the connection plate 30 and each of the leaning members 503 of the triggering member 50 are mating structures capable of leaning against each other. For example, each of the leaning portions 301 of the connection plate 30 may be a plate extending from the edge of the hollow hole 35, and each of the leaning members 503 of the triggering member 503 may be a notch corresponding to the plate. Alternatively, in some embodiments, each of the leaning portions 301 of the connection plate 30 may be a plate extending from the edge of the hollow hole 35, and the triggering member 50 directly leans on the leaning portions 301.

Further, as shown in FIGS. 3, 4, and 8, in this embodiment, the substrate 10 comprises at least one supporting portion 101 corresponding to the hollow hole 35. Here, the substrate 10 has several supporting portions 101. Each of the supporting portions 101 is a bent plate integrally formed on and upwardly bent from the substrate 10. The supporting portions 101 respectively abut against two opposite sides of the bottom portion of the triggering member 50, so that the triggering member 50 is further supported by the substrate 10 to prevent the deflection or dropping of the triggering member 50 during operation. Moreover, during the upward movement of the triggering member 50, once one side of the triggering member 50 tilts, the opposite side of the triggering member 50 interferes and abuts against the corresponding supporting portion 101, thereby further accelerating the triggering member 50 to push and compress the resilient member 40 to trigger the trigger switch 22.

Further, as shown in FIGS. 3 and 4, the triggering member 50 further comprises at least one first limiting portion 501. In this embodiment, the triggering member 50 has two first limiting portions 501. Each of the first limiting portions 501 is an insertion groove at the edge of the triggering member 50. The connection plate 30 comprises two second limiting portions 302, and the number and positions of the first limiting portions 501 correspond to the number and positions of the second limiting portions 302. In this embodiment, each of the second limiting portions 302 is a protruding block extending from the edge of the hollow hole 35. and the two second limiting portions 302 are respectively inserted into and lean against the two first limiting portions 501, so that the horizontal movement of the triggering member 50 is limited. Therefore. during the 25 upward movement of the triggering member 50, the triggering member 50 does not deflect or wobble easily, thereby allowing the upward movement of the triggering member 50 to be more stable.

However, it is understood that the foregoing embodiments are illustrative purposes. In some embodiments, each of the first limiting portions 501 of the triggering member 50 and each of the second limiting portions 302 of the connection plate 30 are mating structures capable of leaning against each other. For example, the first limiting portion 501 and the second limiting portion 302 may be protruding blocks leaning against each other. Alternatively, in some embodiments, the first limiting portion 501 may be a protruding block, and the second limiting portion 302 may be an insertion groove corresponding to the protruding block.

Figure 9:
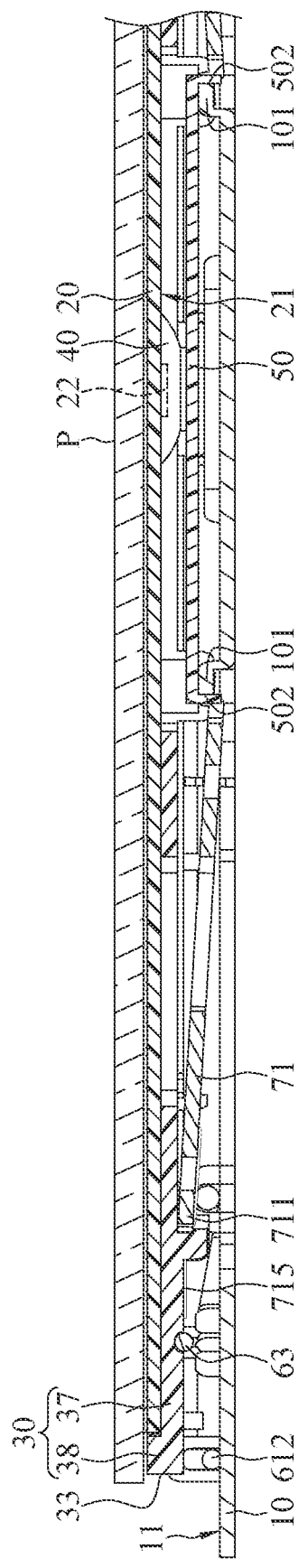
FIG. 9 illustrates a cross-sectional view along line 9-9 shown in FIG. 4.

FIG. 9 illustrates a cross-sectional view along line 9-9 shown in FIG. 4. As shown in FIGS. 3 and 9, in this embodiment, the triggering member 50 comprises at least one stopping portion 502, and the stopping portion 502 leans against the substrate 10 to limit the horizontal movement of the triggering member 50. Here, the triggering member 50 comprises several stopping portions 502. Each of the stopping portions 502 is a plate integrally extending and bent downwardly from the triggering member 50. The stopping portions 502 are at two opposite sides of the triggering member 50 respectively and respectively lean against the outer sides of the supporting portions 101 of the substrate 10, thereby improving the limiting of the horizontal movement of the triggering member 50.

As shown in FIGS. 2 and 3, in this embodiment, the connection plate 30 further comprises at least one limiting member 303. The limiting member 303 may be an insertion groove for being inserted by and leaned against a limiting plate 14 of the substrate 10. Therefore, the horizontal movement of the connection plate 30 can be limited by the substrate 10. Hence, during the upward movement of the connection plate 30, the connection plate 30 does not deflect or wobble easily, thereby allowing the upward movement of the connection plate 30 to be more stable.

However, it is understood that the foregoing embodiments are illustrative purposes. In some embodiments, the connection plate 30 and the substrate 10 may have mating structures capable of leaning against each other. For example, the limiting member 303 of the connection plate 30 may be a protruding block for being inserted into the insertion groove of the substrate 10, thereby limiting the horizontal movement of the connection plate 30. Alternatively, in some embodiments, the limiting member 303 of the connection plate 30 may be a protruding block for leaning against the protruding block on the substrate 10, thereby limiting the horizontal movement of the connection plate 30.

As shown in FIGS. 3 and 4, the connection plate 30 comprises several elastic arms 304, 305. When the touchpad P is pressed, each of the elastic arms 304 elastically leans against the first swing plate 71 and provides an elastic force toward the third side 33, and each of the elastic arms 305 elastically leans against the second swing plate 72 and provides an elastic force toward the fourth side 34. Therefore, when the touchpad P is released, the first swing plate 71 and the second swing plate 72 can be accelerated to reset resiliently through the elastic forces of the elastic arms 304, 305. Moreover, during the operation of the touchpad device 1, shaking and noises can be reduced through the cushioning effect provided by the elastic arms 304, 305.

Further, as shown in FIGS. 4 and 5, in this embodiment, the connection plate 30 comprises at least one limiting hook 39, and the first outer side 711 of the first swing plate 71 is sandwiched between the at least one limiting hook 39 and the main plate 37, thereby preventing the first swing plate 71 from having deflection or wobbling during operation. Moreover, since the elastic arms 304 elastically lean against the first swing plate 71, the first outer side 711 of the first swing plate 71 can be prevented from detaching off the at least one limiting hook 39 to further improving the limiting of the first swing plate 71. In some embodiments, the connection plate 30 may comprise several limiting hooks 39, and the second outer side 721 of the second swing plate 72 is sandwiched between some of the limiting hooks 39 and the main plate 37, thereby preventing the second swing plate 72 from having deflection or wobbling during operation.

As shown in FIGS. 3 and 4, in this embodiment, the touchpad device 1 further comprises a third balance bar 63 and a fourth balance bar 64. The third balance bar 63 is disposed between the third side 33 of the connection plate 30 and the first swing plate 71, and the fourth balance bar 64 is disposed between the fourth side 34 of the connection plate 30 and the second swing plate 72. The third balance bar 63 comprises a third rotation shaft 631 and two third side bars 632 respectively connected to two ends of the third rotation shaft 631. The third rotation shaft 631 is perpendicular to the first rotation shaft 611 and is pivotally connected to the connection plate 30, and the two third side bars 632 are movably connected to the substrate 10. The fourth balance bar 64 comprises a fourth rotation shaft 641 and two fourth side bars 642 respectively connected to two ends of the fourth rotation shaft 641. The fourth rotation shaft 641 is perpendicular to the first rotation shaft 611 and is pivotally connected to the connection plate 30, and the two fourth side bars 642 are movably connected to the substrate 10. Accordingly, in one or some embodiments of the instant disclosure, the third balance bar 63 and the fourth balance bar 64 further improve the rigidities of the corners and the periphery of the touchpad device 1. Hence, when the touchpad P is pressed, the pressing force can be transmitted to other components more quickly through the first balance bar 61, the second balance bar 62, the third balance bar 63. and the fourth balance bar 64.

Moreover, as shown in FIG. 3, in this embodiment, two third assembling members 104 protrude from the substrate 10 and are spaced apart from each other, and the two third assembling members 104 are provided for being assembled with the two third side bars 632. Similarly, two fourth assembling members 105 protrude from the substrate 10 and are spaced apart from each other, and the two fourth assembling members 105 are provided for being assembled with the two fourth side bars 642. Each of the third assembling members 104 and the fourth assembling members 105 is a hook holder integrally extending upward from the substrate 10 (in this embodiment, the hook holder is a U-shaped hook holder, but embodiments are not limited thereto; the hook holder may be an L-shaped hook holder, a T-shaped hook holder, or hook holders with other shaped). End portions of the two third side bars 632 are respectively inserted into the two third assembling members 104, and end portions of the two fourth side bars 642 are respectively inserted into the two fourth assembling members 105. Accordingly, when the touchpad P is pressed to move toward the substrate 10, the third rotation shaft 631 and the fourth rotation shaft 641 are rotatable with respect to the connection plate 30, the end portion of each of the third side bars 632 is slidable with respect to the corresponding third assembling member 104. and the end portion of each of the fourth side bars 642 is slidable with respect to the corresponding fourth assembling member 105, so that each of the third side bars 632 and each of the fourth side bars 642 are swingable with respect to the substrate 10.

As above, in the touchpad device according to one or some embodiments of the instant disclosure, the first balance bar and the second balance bar are respectively connected to the first side and the second side of the connection plate, and the first swing plate and the second swing plate are respectively adjacent to the third side and the fourth side of the connection plate. Therefore, when any portion of the touchpad (e.g., any corner or any edge of the touchpad) is pressed, the pressing force can be transmitted to other components through the first balance bar, the second balance bar, the first swing plate, and the second swing plate, thereby greatly reducing the idle stroke of the touchpad upon the touchpad is pressed. Moreover, when the first swing plate and the second swing plate are pressed, the first swing plate and the second swing plate drive the triggering member to move toward the trigger switch, so that the trigger switch and the triggering member come close to, abut against, and press each other to generate signals and further to shorten the pressing stroke of the touchpad.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:
1. A touchpad device comprising:
  a substrate comprising a top surface;
  a circuit board disposed above the top surface of the substrate, wherein the circuit board comprises a bottom surface facing the top surface, and the bottom surface comprises a trigger switch;

a connection plate fixed on the bottom surface of the circuit board, wherein the connection plate comprises a first side, a second side, a third side, and a fourth side connected to each other; the first side and the second side are opposite sides, the third side and the fourth side are opposite sides, and the connection plate has a hollow hole corresponding to the trigger switch;

a resilient member disposed between the substrate and the circuit board;

a triggering member disposed between the substrate and the circuit board and corresponding to the hollow hole;

a first balance bar and a second balance bar, wherein the first balance bar is disposed between the first side and the substrate, and the second balance bar is disposed between the second side and the substrate; and a first swing plate and a second swing plate, wherein the first swing plate and the second swing plate are disposed between the substrate and the circuit board; the first swing plate is connected between the third side and the triggering member, and the second swing plate is connected to the fourth side and the triggering member; the first swing plate and the second swing plate are pressable to move with respect to the substrate, so that the first swing plate and the second swing plate drive the triggering member to move upwardly and move toward the trigger switch.

2. The touchpad device according to claim 1, wherein the triggering member is in the hollow hole, the connection plate has at least one leaning portion, and the triggering member leans against the at least one leaning portion.

3. The touchpad device according to claim 1, wherein the triggering member is in the hollow hole, the substrate comprises at least one supporting portion corresponding to the hollow hole, and the triggering member leans against the at least one supporting portion.

4. The touchpad device according to claim 1, wherein the triggering member comprises a first limiting portion, the connection plate comprises a second limiting portion, and the first limiting portion and the second limiting portion lean against each other to limit a horizontal movement of the triggering member.

5. The touchpad device according to claim 4, wherein the first limiting portion is an insertion groove, the second limiting portion is a protruding block, and the protruding block extends from an edge of the hollow hole and is inserted into the insertion groove.

6. The touchpad device according to claim 1, wherein the triggering member comprises a stopping portion, and the stopping portion leans against the substrate to limit a horizontal movement of the triggering member.

7. The touchpad device according to claim 1, wherein the connection plate comprises a limiting member, and the limiting member leans against the substrate to limit a horizontal movement of the connection plate.

8. The touchpad device according to claim 1, wherein the connection plate comprises an elastic arm elastically leaning against the first swing plate and providing an elastic force toward the third side.

9. The touchpad device according to claim 1, wherein the first swing plate comprises a first outer side and a first inner side, the first outer side is nearer to the third side as compared with the first inner side, and the first swing plate abuts against a bottom portion of the triggering member with the first inner side.

10. The touchpad device according to claim 9, further comprising a first flexible sheet connected between the first outer side of the first swing plate and the connection plate.

11. The touchpad device according to claim 9, wherein the substrate comprises a supporting member, the supporting member abuts against a bottom portion of the first swing plate and is between the first outer side and the first inner side.

12. The touchpad device according to claim 11, wherein the supporting member is a C-shaped supporting member and has a lateral guide slot, and one side of the first swing plate is received in the lateral guide slot.

13. The touchpad device according to claim 1, wherein the connection plate comprises a main plate and a surrounding frame connected around the main plate, the main plate leans against the bottom surface of the circuit board, a thickness of the surrounding frame is greater than a thickness of the main plate, and the surrounding frame leans against a peripheral portion of the circuit board.

14. The touchpad device according to claim 13, wherein the surrounding frame comprises a first long groove and a second long groove, the first balance bar is pivotally connected to the first long groove, and the second balance bar is pivotally connected to the second long groove.

15. The touchpad device according to claim 1, wherein the first balance bar comprises a first rotation shaft and two first side bars respectively connected to two ends of the first rotation shaft, the first rotation shaft is arranged along the first side, and the two first side bars are movably connected to the substrate; the second balance bar comprises a second rotation shaft and two second side bars respectively connected to two ends of the second rotation shaft, the second rotation shaft is arranged along the second side, and the two second side bars are movably connected to the substrate.

16. The touchpad device according to claim 15, further comprising a third balance bar and a fourth balance bar, wherein the third balance bar is disposed between the third side and the first swing plate, and the fourth balance bar is disposed between the fourth side and the second swing plate; the third balance bar comprises a third rotation shaft and two third side bars respectively connected to two ends of the third rotation shaft, the third rotation shaft is perpendicular to the first rotation shaft and is pivotally connected to the connection plate, and the two third side bars are movably connected to the substrate; the fourth balance bar comprises a fourth rotation shaft and two fourth side bars respectively connected to two ends of the fourth rotation shaft, the fourth rotation shaft is perpendicular to the first rotation shaft and is pivotally connected to the substrate, and the two fourth side bars are movably connected to the substrate.

* * * * *